Nov. 10, 1925.

R. L. MUGFORD

SAFETY BRAKE FOR MINES

Filed Feb. 12, 1924

1,561,348

2 Sheets-Sheet 1

Richard L. Mugford
INVENTOR

BY Victor J. Evans
ATTORNEY

Nov. 10, 1925.

R. L. MUGFORD 1,561,348

SAFETY BRAKE FOR MINES

Filed Feb. 12, 1924    2 Sheets-Sheet 2

Richard L. Mugford
INVENTOR
BY *Victor J. Evans*
ATTORNEY

WITNESS:

Patented Nov. 10, 1925.

1,561,348

UNITED STATES PATENT OFFICE.

RICHARD L. MUGFORD, OF MINERSVILLE, PENNSYLVANIA.

SAFETY BRAKE FOR MINES.

Application filed February 12, 1924. Serial No. 692,339.

*To all whom it may concern:*

Be it known that I, RICHARD L. MUGFORD, a citizen of the United States, residing at Minersville, in the county of Schuylkill and State of Pennsylvania, have invented new and useful Improvements in Safety Brakes for Mines, of which the following is a specification.

This invention relates to brake structures, and more particularly to a safety brake structure particularly designed for use on mine cars, and an object of the invention is to provide a brake structure by means of which a mine car will be stopped when the same strikes an obstruction or in case one car bumps into another.

Another object of this invention is to provide a safety brake structure, as specified, which is automatic in its operation and which also includes mechanism whereby the brakes may be manually operated at the will of the driver or operator of the car.

More specifically, the invention comprehends the provision of a clutch mounted upon each axle of the car, and rotatable therewith, and a companion clutch section which is held against rotation and is moved at predetermined times into engagement with a rotary clutch section for arresting rotation of the axle and of the supporting wheels of the car, and to provide means automatically operable for moving the nonrotatable braking clutch section into operative braking position.

Figure 1:
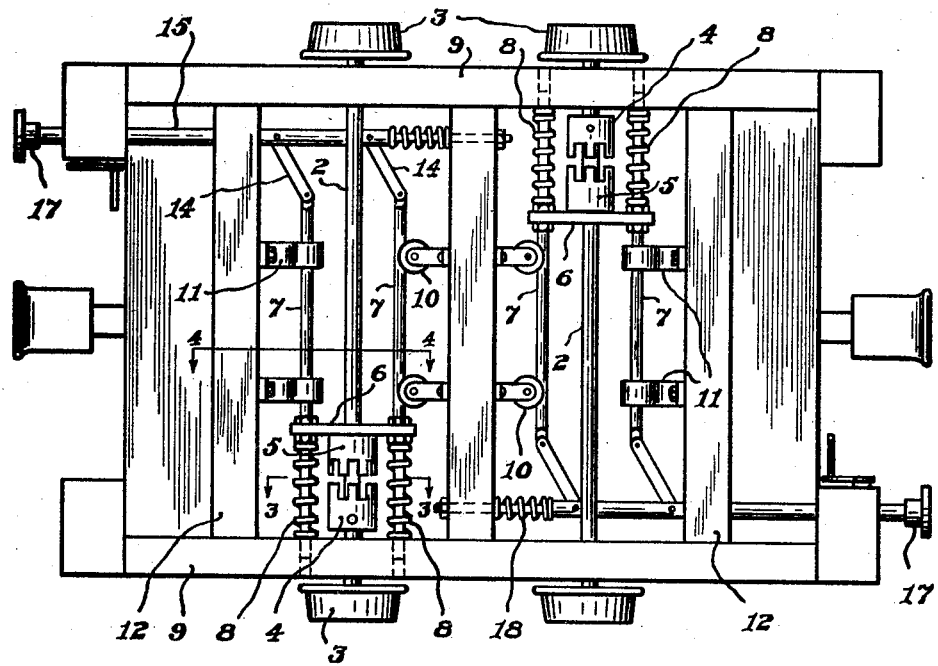

Other objects of the invention will appear in the following detail description, and in the accompanying drawings wherein:

Figure 1—is a top plan of the truck structure of a mine car showing the improved brake structure applied thereto.

Figure 2:
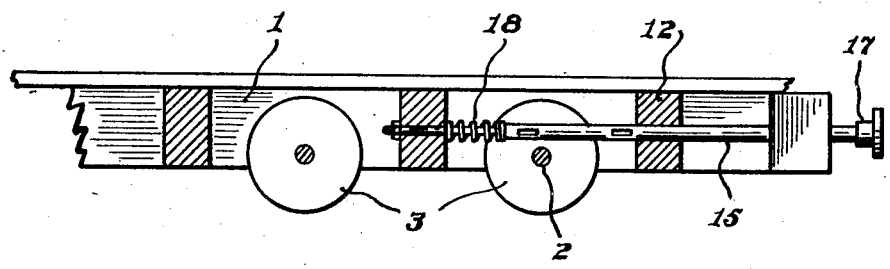

Figure 2—is a longitudinal section through the car truck structure illustrating a part of the brake mechanism.

Figure 3:
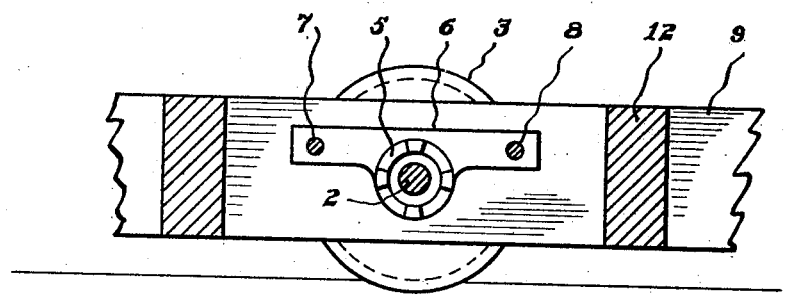

Figure 3—is a detail section taken on the line 3—3 of Figure 1.

Figure 4:
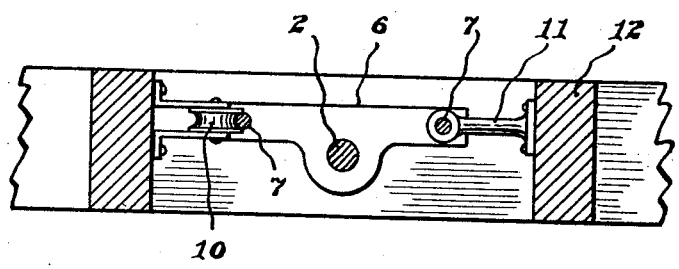

Figure 4—is a detail section taken on the line 4—4 of Figure 1.

Figure 5:
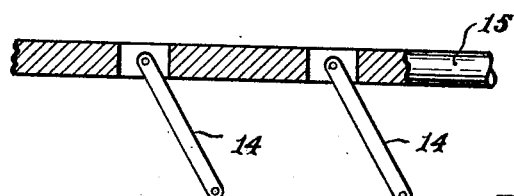

Figure 5—is a detail section on the line 5—5 of Figure 1.

Figure 6:
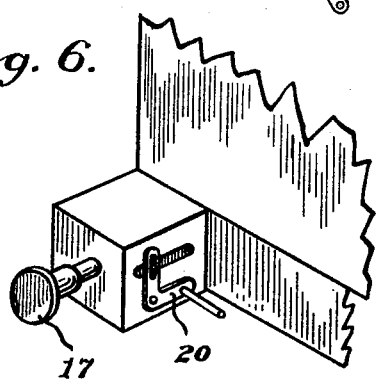

Figure 6—is a detail perspective view illustrating the foot or manual operating means.

Referring more particularly to the drawings, the truck structure 1 of the mine car or analogous structure may be of any approved type or construction, and the same has supporting axles 2 rotatably carried thereby upon the outer ends of which the supporting wheels 3 are mounted. Each of the axles 2 has a brake mechanism associated therewith which brake mechanisms are similar, and consequently, only one will be hereinafter specifically described.

The axle 2 has a clutch section 4 keyed thereon and rotatable therewith with which a companion clutch section 5 co-operates for arresting rotation of the axle 2 and of the wheels 3. The clutch section 5 is held against rotation by means of its supporting plate 6, which is connected to spaced operating rods 7. The clutch section 5 is slidably mounted upon the axle 2 and is held out of braking engagement with the clutch section 4 by spiral springs 8, which are connected to the plate 6 and to a suitable supporting structure carried by the side rail 9 of the truck structure 1. The bars 7 are disposed in parallel relation upon opposite sides of the axle 2, and channeled rotatable guide wheels 10 are provided for guiding the movement of one of the bars 7, while the other bar is guided in its movement by suitable guide structure 11 supported from the cross bar 12 of the truck structure 1. The bars 7 are connected by means of levers 14 to an operating rod 15 which extends forwardly along one side of the truck structure 1. A bumper 17 is carried by the outer end of the rod 15. The rod 15 is yieldably mounted to move inwardly, a limited distance upon the bumper striking an object and in so moving, it moves the links 14 which will shift the rods 7, tensioning the springs 8 and forcing the clutch section 5 into engagement with the clutch section 4 which stops the rotation of the axle 2 and the wheels 3 thereon, and consequently, stops travel of the car structure.

The springs 8 will move the clutch section 5 out of engagement with the clutch section 4 upon the release of the pressure against the bumper 17. Suitable springs 18 are provided for returning the bar 15 to its normal position upon release of the pressure against the bumper 17.

A pivotally mounted foot lever 20 is pivotally carried by the truck structure 1 and is connected to the rod 15 to permit manual shifting of the rod 15 and the consequent operation of the brake structure.

It is, of course, to be understood, that the invention may be constructed in various other manners and the parts associated in different relations, and therefore, I do not desire to be limited in any manner, except as set forth in the claims hereunto appended.

What I claim is:

1. The combination with a car body including a rotatable axle and supporting wheels thereon, of a clutch section keyed to the axle, a movable clutch section slidable on the axle for braking engagement with the first named clutch section, a pair of operating rods connected to said movable clutch section, a plate connecting said movable clutch section to said operating rods for moving the braking clutch section and holding it against rotation, a contact operated rod, links connecting said contact operated rods to said first named operating rod, and a bumper, on said contact operated rod.

2. The combination with a car body including a rotatable axle and supporting wheels thereon of a clutch section keyed to the axle, a movable clutch section slidable on the axle for braking engagement with the first named clutch section, a pair of operating rods connected to said movable clutch section, a plate connecting said movable clutch section to said operating rods for moving the movable clutch section and holding it against rotation, a contact operated rod, links connecting said contact operated rods to said first named operating rod, a bumper, on said contact operated rod, and springs associated with said operating rods for returning them to their normal positions.

In testimony whereof I affix my signature.

RICHARD L. MUGFORD.